United States Patent
Xu et al.

(10) Patent No.: US 12,482,232 B2
(45) Date of Patent: Nov. 25, 2025

(54) IMAGE CROP

(71) Applicants: Hewlett-Packard Development Company, L.P., Spring, TX (US); Purdue Research Foundation, West Lafayette, IN (US)

(72) Inventors: Shaoyuan Xu, West Lafayette, IN (US); Yang Cheng, West Lafayette, IN (US); Jan Allebach, West Lafayette, IN (US); Qian Lin, Palo Alto, CA (US)

(73) Assignees: Purdue Research Foundation, West Lafayette, IN (US); Hewlett-Packard Development Company, L.P., Spring, TX (US)

( * ) Notice: Subject to any disclaimer, the term of this patent is extended or adjusted under 35 U.S.C. 154(b) by 318 days.

(21) Appl. No.: 18/253,264

(22) PCT Filed: Nov. 23, 2020

(86) PCT No.: PCT/US2020/061745
§ 371 (c)(1),
(2) Date: May 17, 2023

(87) PCT Pub. No.: WO2022/108601
PCT Pub. Date: May 27, 2022

(65) Prior Publication Data
US 2024/0020952 A1  Jan. 18, 2024

(51) Int. Cl.
| | | |
|---|---|---|
| G06V 10/82 | (2022.01) | |
| G06V 10/46 | (2022.01) | |
| G06V 10/75 | (2022.01) | |
| G06V 10/77 | (2022.01) | |
| G06V 10/771 | (2022.01) | |
| G06V 10/80 | (2022.01) | |
| G06V 20/40 | (2022.01) | |
| G06V 20/58 | (2022.01) | |

(52) U.S. Cl.
CPC .......... *G06V 10/771* (2022.01); *G06V 10/462* (2022.01); *G06V 10/7715* (2022.01); *G06V 10/80* (2022.01); *G06V 10/82* (2022.01)

(58) Field of Classification Search
CPC ............. G06V 10/771; G06V 10/7715; G06V 10/462; G06V 10/82; G06V 10/80
See application file for complete search history.

(56) References Cited

U.S. PATENT DOCUMENTS

| | | |
|---|---|---|
| 8,660,351 B2 | 2/2014 | Tang |
| 9,330,334 B2 | 5/2016 | Lin et al. |
| 9,355,432 B1 | 5/2016 | Goldman |

(Continued)

OTHER PUBLICATIONS

Dong-Hyun Lee: "Fully Convolutional Single-Crop Siamese Networks for Real- Time Visual Object Tracking", MDPI, Sep. 24, 2019, pp. 11.

(Continued)

*Primary Examiner* — David F Dunphy
(74) *Attorney, Agent, or Firm* — Quarles & Brady LLP (57) ABSTRACT

A saliency map of an image is generated. Saliency regions of the saliency map are identified. The saliency regions are merged into a combined saliency region. Candidate image crops of the image are generated based on the combined saliency region. An image crop of the image is selected from the candidate image crops using a machine learning model.

19 Claims, 12 Drawing Sheets

(56) References Cited

U.S. PATENT DOCUMENTS

| | | |
|---|---|---|
| 9,454,712 B2 | 9/2016 | Lin et al. |
| 9,483,702 B2 | 11/2016 | Fredembach |
| 2016/0104055 A1* | 4/2016 | Lin .................... G06T 3/04 |
| | | 382/298 |
| 2017/0193324 A1* | 7/2017 | Chen .................. G06V 10/26 |
| 2021/0056663 A1* | 2/2021 | Zhang ................ G06T 11/60 |
| 2022/0130130 A1* | 4/2022 | Rhodes .............. G06N 3/045 |
| 2023/0326601 A1* | 10/2023 | Xue .................... A61B 5/36 |
| | | 600/523 |

OTHER PUBLICATIONS

Wenguan Wang: "Deep Visual Attention Prediction", IEEE Transactions on Image Processing, Mar. 22, 2018, pp. 1-10, Tabels IV-VIII, fig .2.

* cited by examiner

IMAGE CROP

BACKGROUND

Initially with the introduction of digital cameras, and then with the burgeoning popularity of smartphones having picture-taking capabilities, the ability to take digital pictures easily and often has become available to a large percentage, if not the vast majority, of users. While capturing digital images was originally the provenance of professional users, digital image capture has therefore become much more democratic and thus widespread. That is, most users who use their smartphones and other image-capturing devices have little to no professional training in photography.

DETAILED DESCRIPTION

As noted in the background, digital picture taking has become widespread, with users having little to no professional photography background being easily able to frequently capture large numbers of images using their smartphones and other image-capturing devices. Unlike a professional photographer who may painstakingly frame or compose a scene before capturing an image, a typical user is more likely to take a digital picture when the mood strikes, often with little consideration given to the composition of a scene other than to ensure that the image includes the entirety of the object of interest. As a result, the digital images captured by typical users may pale in comparison to those captured by professionals.

To improve digitally captured images, smartphones and other computing devices can include computer programs that post-process the images. The computer programs may afford the user with the ability to crop images, which is the removal of unwanted, peripheral, and/or outer areas from an image so that the primary focus of the image occupies more of the image. Image cropping may also be employed to change the aspect ratio of an image. Manual image cropping, while relatively easy to accomplish, can become laborious when a large number of images have to be cropped. Therefore, some computer programs provide for automatic cropping of images. However, the resulting image crops are often less than optimal, frequently cutting off parts of legs and arms of the subjects of the images, among other important aspects of the images.

Techniques described herein ameliorate these and other issues with existing automatic image cropping approaches. Candidate image crops of an image are generated in a saliency-based manner, such as a deep learning saliency-based approach. Image saliency can be considered the specification of which parts of an image are most important or useful, and may be a subjective perceptive measure of these parts of the image. A machine learning model, which may be a neural network trained as a twin or Siamese neural network, is then used to select an image crop of the image from the generated candidate image crops.

Figure 1:
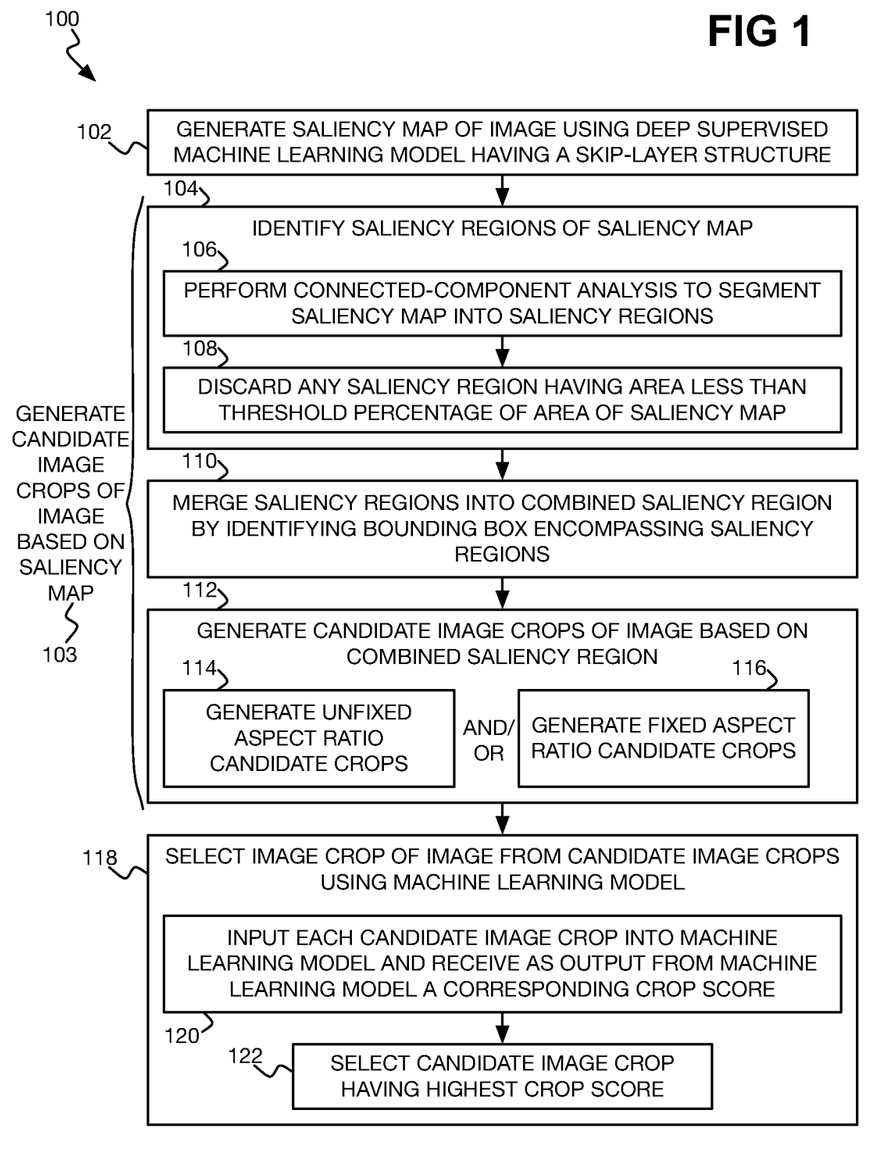
FIG. 1 is a flowchart of an example method for automatically generating an image crop of an image.

FIG. 1 shows an example method 100 for automatically generating an image crop of an image. The method 100 may be implemented as program code stored on a non-transitory computer-readable data storage medium and executed by a processor of a computing device. The computing device may be the same or different device used to digitally capture an image. For example, the computing device may be a smartphone, a desktop, laptop, or notebook computer, a tablet computing device, or another type of computing device. The computing device may instead be a server, such as a cloud computing server, to which a smartphone or other device transmitted the image after capture, over a network such as the Internet.

The method 100 includes generating a saliency map of an image (102). The saliency map segments salient portions of the image from non-salient portions of the image. The saliency map may be a monochromatic image, such as a black-and-white image, with the salient image portions being in one color (e.g., white), and the non-salient portions being in another color (e.g., black). The saliency map may be generated using a machine learning model, such as a deep supervised machine learning model having a skip-layer structure. Generation of the saliency map using the latter type of machine learning model is described in Q. Hou, et al., "Deeply Supervised Salient Object Detection with Short Connections," in IEEE Transactions on Pattern Analysis and Machine Intelligence, vol. 41, no 4 (2019). Image cropping based on a saliency map generated using this type of model has been found to result in better image crops than image cropping based on saliency maps generated using other techniques.

Figure 2A:
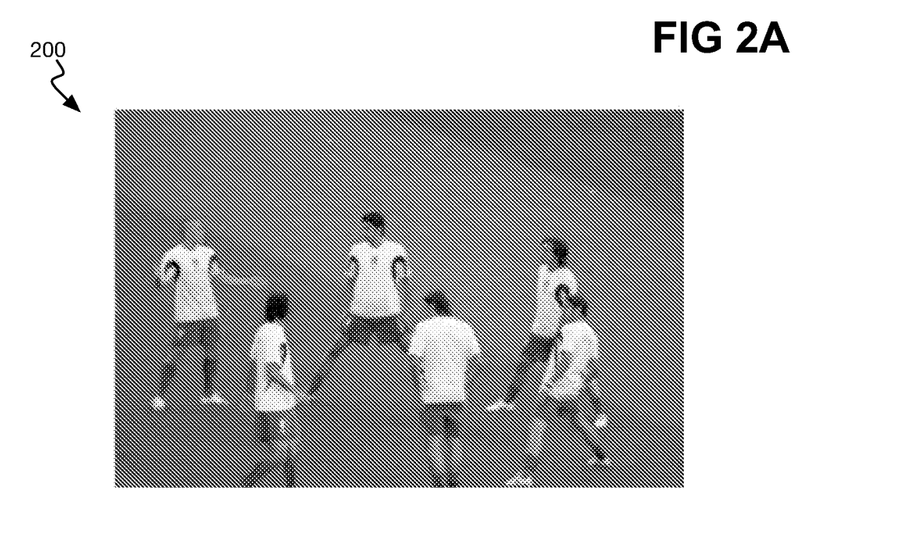
FIGS. 2A, 2B, 2C, and 2D are diagrams illustratively depicting example performance of the method of FIG. 1.
Figure 2B:
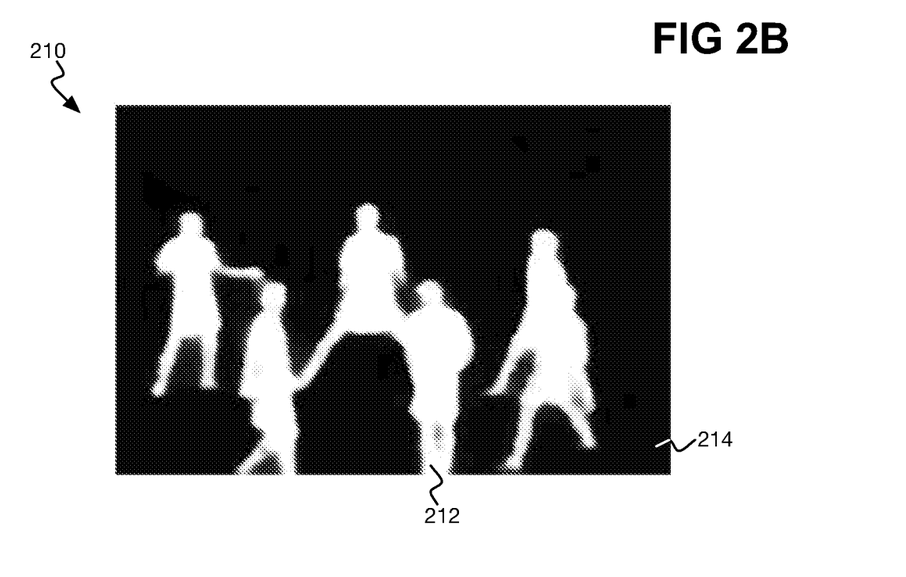

FIG. 2A shows an example image 200 of a number of soccer, or football, players. FIG. 2B shows an example saliency map 210 of the image 200. The saliency map 210 includes salient portions 212 in white against non-salient portions 214 in black. The saliency map 210 was generated from the image 200 using the deep supervised machine learning model described in the referenced Hou paper.

Referring back to FIG. 1, the method 100 includes generating candidate image crops of the image based on the saliency map (103). Specifically, the method 100 includes identifying saliency regions of the saliency map (104). The saliency regions of the saliency map can be identified by performing connected-component analysis on the saliency map to segment the saliency map into the saliency regions (106). Connected-component analysis may be performed using the eight-connection such analysis technique described in C. Grana et al., "Optimized Block-based Connected Components Labeling with Decision Trees," in IEEE Transactions on Image Processing, vol. 19, no. 6 (2010). The identified saliency regions may be pruned by discarding any saliency region having an area less than a threshold percentage, such as 1%, of the total area of the saliency map (108).

The method 100 includes then merging the saliency regions into a single combined saliency region by identifying a bounding box encompassing the saliency regions (110). Specifically, a bounding box for each saliency region that minimally encompasses the saliency region in question may be identified. These individual bounding boxes are merged by keeping their topmost, bottommost, leftmost, and rightmost edges, which results in a bounding box that defines the combined saliency region.

Figure 2C:
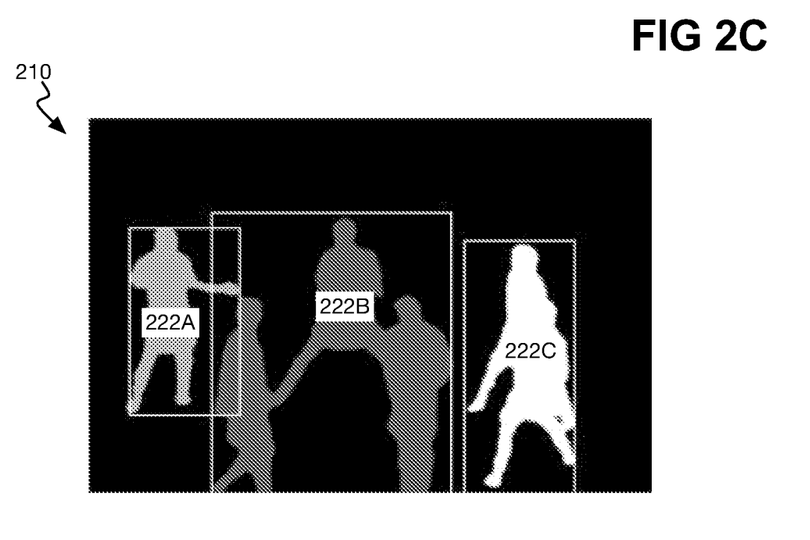
Figure 2D:
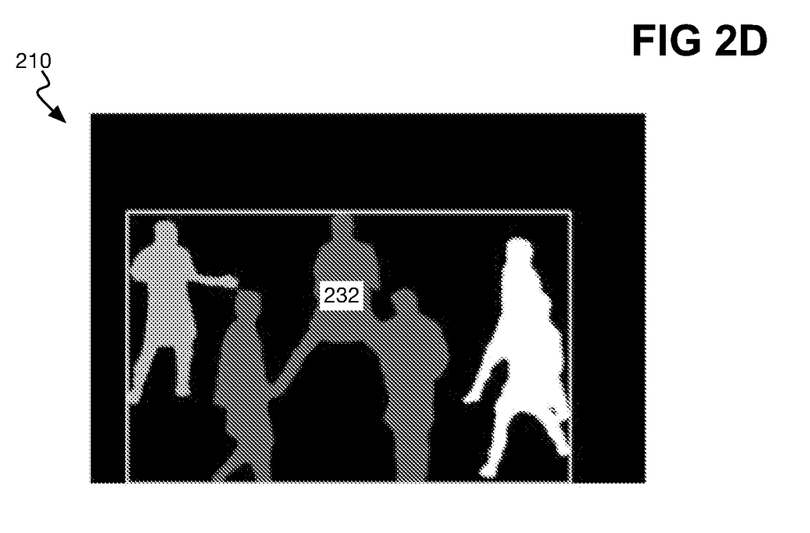

FIG. 2C shows the example saliency map 210 of the image 200 in which three saliency regions 222A, 222B, and 222C, which are collectively referred to as the saliency regions 222, have been identified. Each saliency region 222 has a corresponding bounding box. FIG. 2D shows the example saliency map 210 in which the saliency regions 222 have been merged into a combined saliency region 232. The combined saliency region 232 has a bounding box with a left edge collinear with the leftmost edge of the bounding boxes of the saliency regions 222 (viz., the left edge of the bounding box of the region 222A) and a right edge collinear with the rightmost edge of the bounding boxes of the saliency regions (viz., the right edge of the bounding box of the region 222C). The bounding box defining the combined saliency region 232 has a top edge collinear with the topmost edge of the bounding boxes of the saliency regions 222 (viz., the top edge of the bounding box of the region 222B) and a bottom edge collinear with the bottommost edge of the bounding boxes of the saliency regions 222 (viz., the bottom edges of the bounding boxes of the regions 222B and 222C).

Referring back to FIG. 1, the method 100 includes generating candidate image crops of the image based on the combined saliency region (112). For example, two sets of candidate image crops may be generated. The first set of candidate image crops that are generated may have unfixed aspect ratios (114). That is, the candidate image crops are generated without consideration of their aspect ratios, so long as the aspect ratios are within a specified range. The second set of candidate image crops that are generated may by comparison have fixed aspect ratios (116). That is, the candidate image crops are generated at specified aspect ratios, such as 16:9, 4:3, 3:4, 9:16, and 1:1 aspect ratios. Example techniques for generating unfixed aspect ratio candidate crops in part 114 and aspect ratio candidate crops in part 116 are described later in the detailed description.

The method 100 includes selecting an image crop of the image from the candidate image crops using a machine learning model (118). For instance, each candidate image crop may be input into the machine learning model, with a corresponding crop score received as output from the model (120). The candidate image crop having the highest crop score may then be selected as the image crop of the image (122). The machine learning model may be a neural network trained as a twin neural network based on reference images and image crops of the reference images using a ranking loss objective in which the image crops are negative samples and the reference images are positive samples. An example training technique for such a machine learning model training is described later in the detailed description.

Figure 3A:
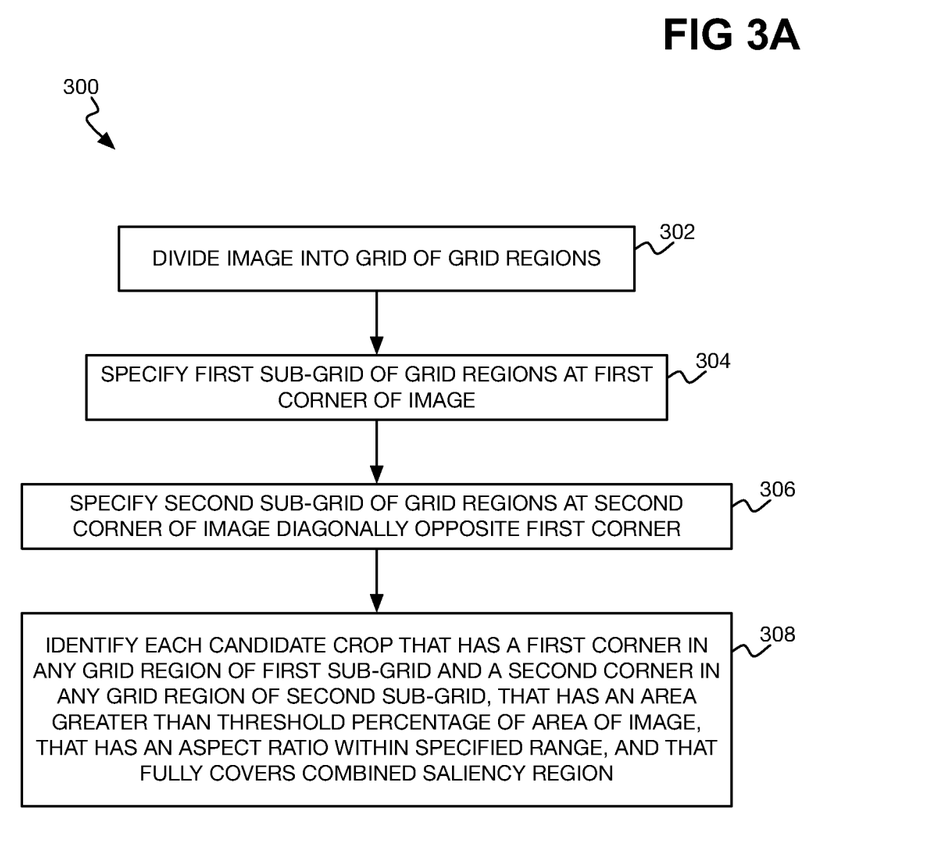
FIG. 3A is flowchart of an example method for generating candidate image crops of an image with unfixed aspect ratios, based on a combined saliency region of a saliency map of the image.

FIG. 3A shows an example method 300 for generating candidate image crops of an image with unfixed aspect ratios, based on a combined saliency region of a saliency map of the image. The method 300 may be performed to realize part 114 of the method 100, for instance. Like the method 100, the method 300 can be implemented as program code stored on a non-transitory computer-readable data storage medium, and executable by a processor of a computing device.

The method 300 includes dividing the image into a grid of grid regions (302). For example, the image may be divided into a grid having M=16 rows and N=16 columns, for a total of M×N=256 grid regions. The method 300 includes specifying a first sub-grid of grid regions at a first corner of the image (304), and a second sub-grid of grid regions at a second corner of the image that is diagonally opposite the first corner (306). For example, the first and second sub-grids may be at the upper-left and lower-right corners of the image, respectively. Each sub-grid may have m=4 rows and n=4 columns, for a total of m×n=16 grid regions.

The method 300 includes identifying each candidate crop satisfying the following conditions (308). The first condition is that a candidate crop has a first corner in any grid region of the first sub-grid and a diagonally opposite second corner in any grid region of the second sub-grid. The first and second corners may be centered in grid regions of the first and second sub-grids, respectively, for instance. The second condition is that the candidate crop has an area greater than a threshold percentage, such as 50%, of the area of the image and has an aspect ratio within a specified range of aspect ratios, such as between 0.5 and 2. The third condition is that the candidate crop fully covers, encompasses, or includes the combined saliency region (i.e., the bounding box defining the combined saliency region) of the saliency map of the image.

Figure 3B:
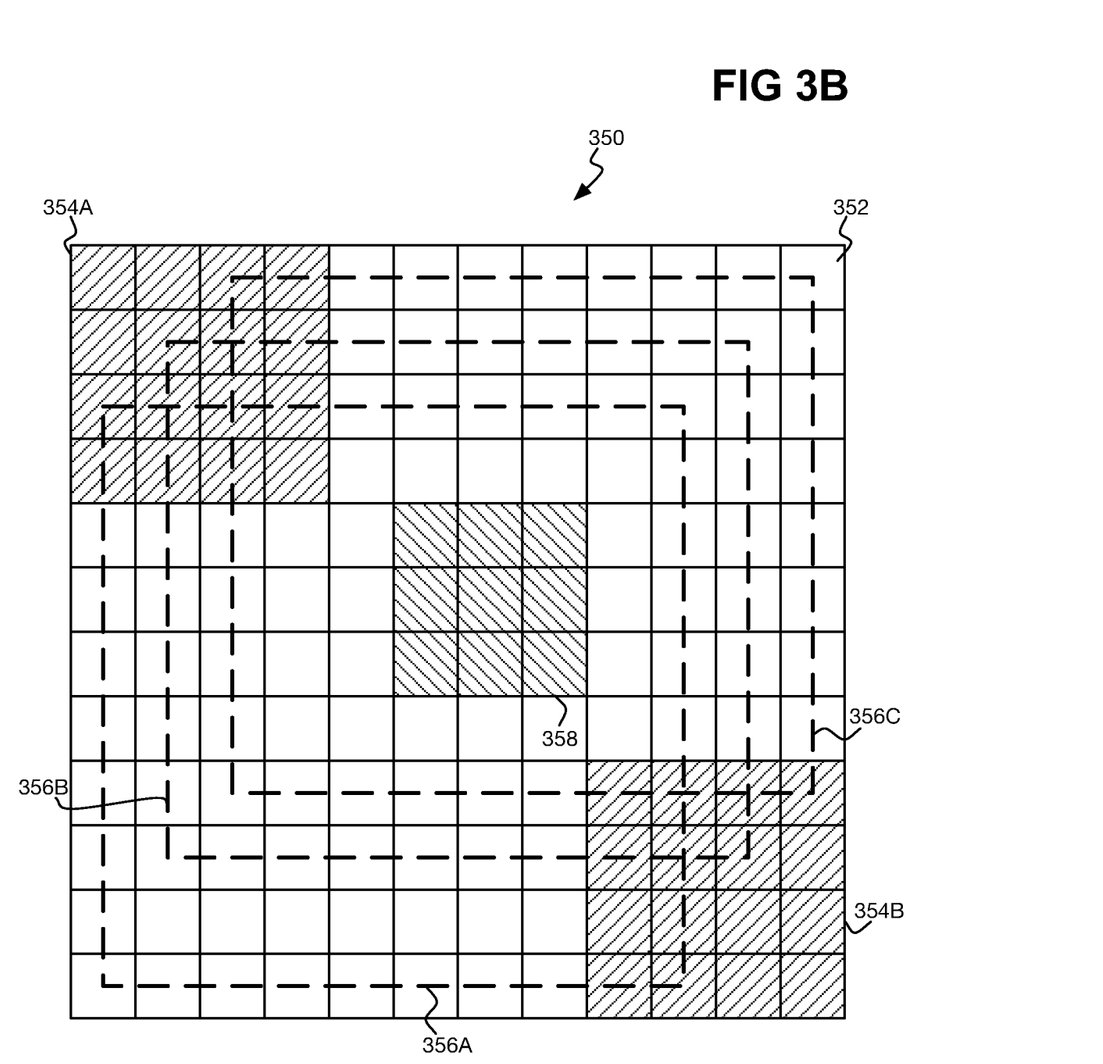
FIG. 3B is a diagram illustratively depicting example performance of the method of FIG. 3A.

FIG. 3B shows example performance of the method 300. An image 350 has been divided into a grid of 16×16 grid regions 352. First and second 4×4 sub-grids 354A and 354B, collectively referred to as the sub-grids 354, have been specified at opposing corners of the image 350. Three example candidate image crops 356A, 356B, and 356C, collectively referred to as the candidate image crops 356, are shown in FIG. 3B. Each image crop 356 has an upper-left corner centered in a grid region 352 of the first sub-grid 354A and a lower-right corner centered in a grid region 352 of the second sub-grid 354B. Each image crop 356 has an area greater than 50% of the total area of the image 350, and has an aspect ratio within the specified aspect ratio range of 0.5 and 2. Each image crop 356 further fully covers a combined saliency region 358 of the saliency map of the image 350.

Figure 4A:
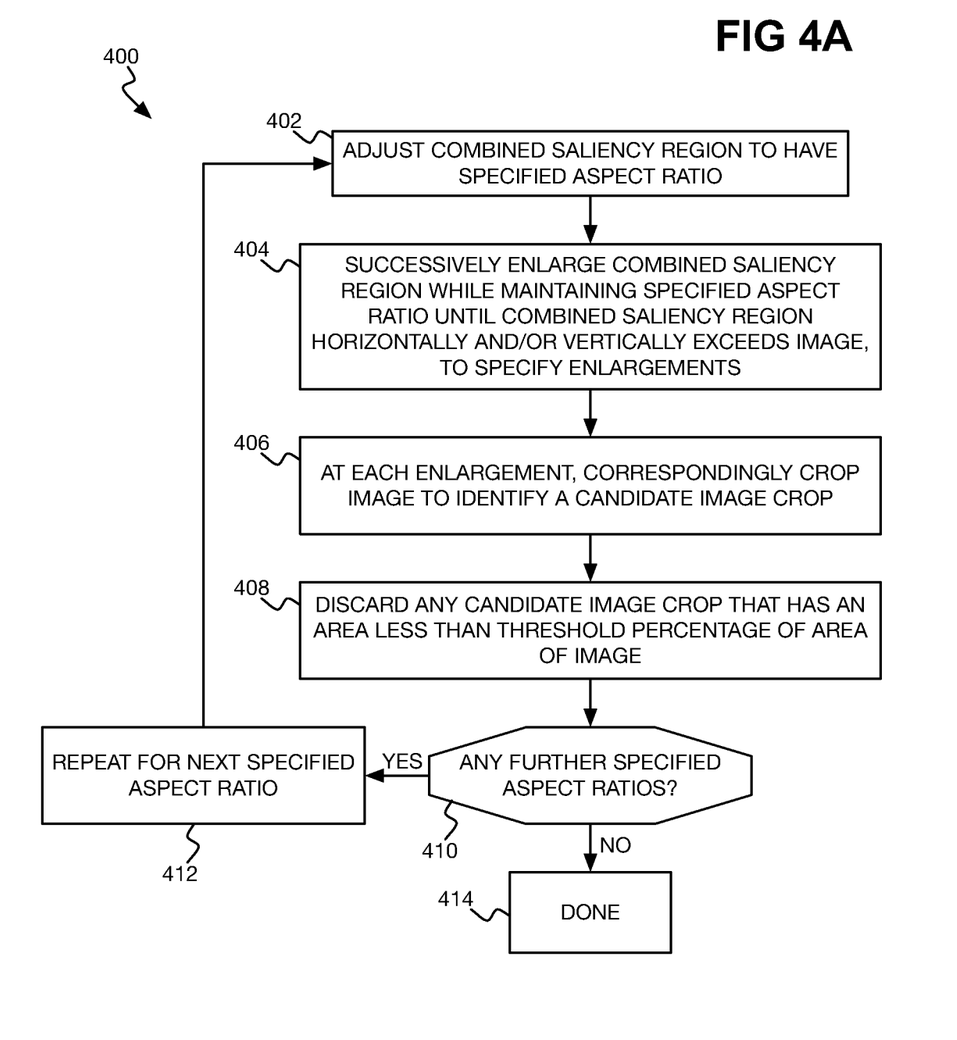
FIG. 4A is a flowchart of an example method for generating candidate image crops of an image with fixed aspect ratios, based on a combined saliency region of a saliency map of the image.

FIG. 4A shows an example method 400 for generating candidate image crops of an image with fixed aspect ratios, based on a combined saliency region of a saliency image of the image. The method 400 may be performed to realize part 116 of the method 100, for instance. Like the method 100, the method 400 can be implemented as program code stored on a non-transitory computer-readable data storage medium, and executable by a processor of a computing device.

The method 400 can be performed for each of one or multiple specified aspect ratios. The method 400 includes adjusting the combined saliency region to have a specified aspect ratio (402). For example, the horizontal and/or vertical edges of the combined saliency region may be minimally moved outwards so that its aspect ratio is equal to the specified aspect ratio. The adjusted combined saliency region is considered an initial enlargement of the combined saliency region.

The method 400 includes then successively enlarging the combined saliency region while maintaining the specified aspect ratio until the resultantly enlarged combined saliency region horizontally and/or vertically exceeds the image, to specify further enlargements of the combined saliency region (404). For example, at each enlargement, the left and right edges of the combined saliency region may be moved outwards by a first number of pixels and the top and bottom edges may be moved outwards by a second number of pixels. The first number of pixels divided by the second number of pixels is equal to the specified aspect ratio, so that the resultantly enlarged combined saliency region still has the specified aspect ratio. The process stops after any edge of the combined saliency region extends past the corresponding edge of the image.

The method 400 includes, at each enlargement of the combined saliency region that does not extend beyond any edge of the image, cropping the image in correspondence with the combined saliency region as so enlarged to identify a candidate image crop (406). The method 400 includes discarding any candidate image crop having an area less than a threshold percentage, such as 50%, of the total area of the image (408). If there are further specified aspect ratios for which candidate image crops have not yet been generated (410), the method 400 includes repeating the described process for the next specified aspect ratio (412). Once all candidate image crops have been generated for all the specified aspect ratios (410), the method 400 is finished (414).

Figure 4B:
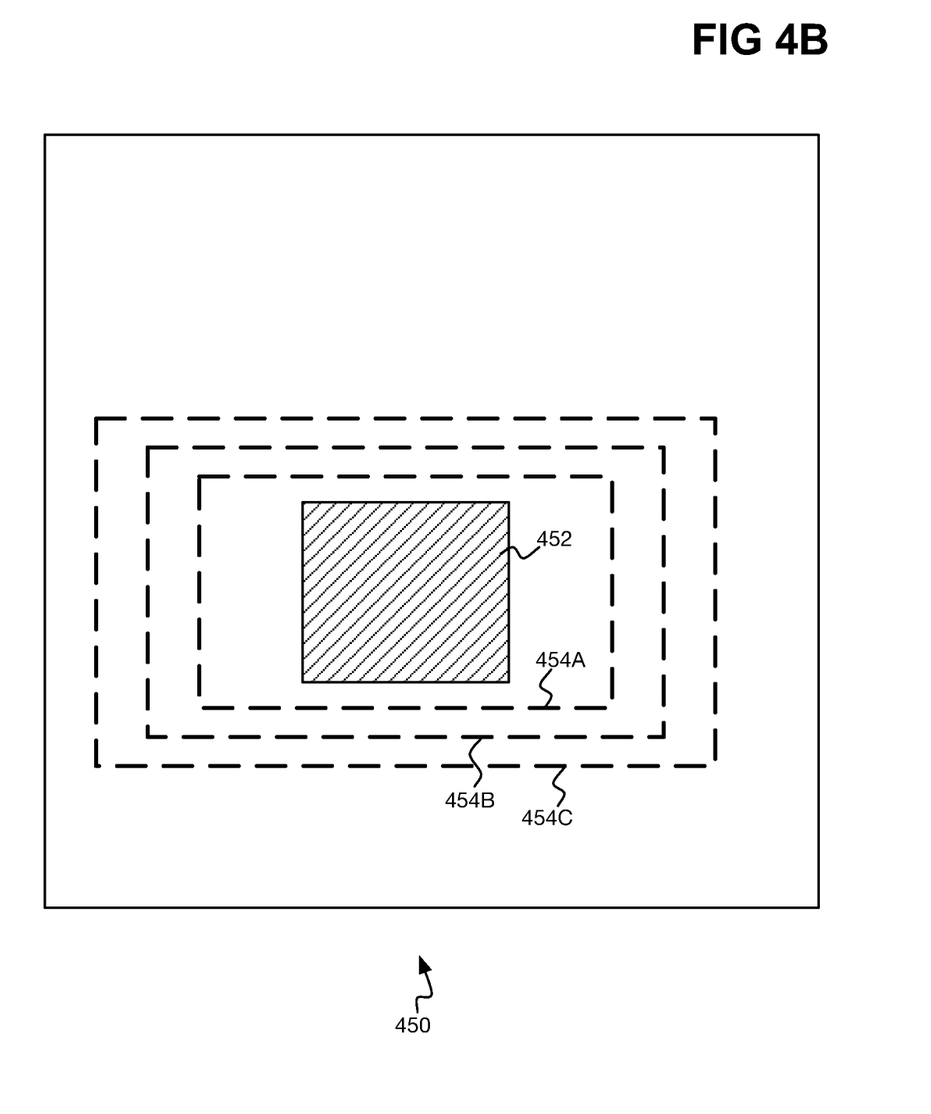
FIG. 4B is a diagram illustratively depicting example performance of the method of FIG. 4A.

FIG. 4B shows example performance of the method 400. An image 450 includes a combined saliency region 452 (i.e., the bounding box defining the combined saliency region 452 within a saliency map of the image 450). In the example of FIG. 4B, the specified aspect ratio is 16:9. The combined saliency region 452 is therefore adjusted to realize an initial enlargement having the specified aspect ratio, at which a candidate image crop 454A is identified. The combined saliency region 454 is further successively enlarged twice to realize additional enlargements having the specified aspect ratio, at which further candidate image crops 454B and 454C are identified, which together with the candidate image crop 454A are collectively referred to as the image crops 454. No further successive enlargement of the combined saliency region 454 is possible without exceeding the left edge of the image 450 in particular.

Figure 5A:
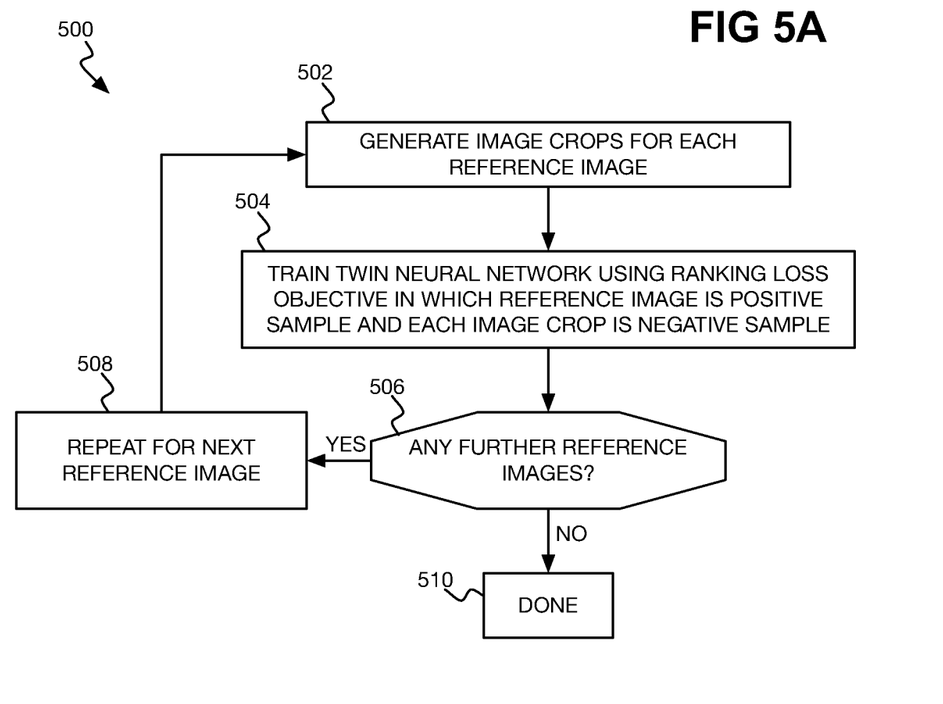
FIG. 5A is a flowchart of an example method for training a machine learning model used to select an image crop of an image from candidate image crops.

FIG. 5A shows an example method 500 for training a machine learning model used to select an image crop of an image from candidate image crops. The machine learning model that the method 500 trains is a neural network that receives a candidate image crop of an image as input and outputs a corresponding crop score for the candidate image crop. The method 500, like the method 100, may be implemented as program code stored on a non-transitory computer-readable data storage medium and executable by a computing device, which may be the same or different device that captures images that are cropped. The method 500 may be performed to pretrain the machine learning model, and the resultantly trained model transmitted to other computing devices to use for image crop selection.

The method 500 trains the machine learning model using reference images. The reference images are professionally captured photos, and are assumed to have perfect composition, such that any deviation therefrom—including image crops—results in aesthetic degradation. This means that the machine learning model can be trained more quickly, because labor-intensive work involved in scoring each individual image crop of a reference image is avoided. The method 500 thus includes generating image crops for a reference image (502). The image crops for the reference image may be generated using the technique described in Y.-L. Chen et al., "Learning to Compose with Professional Photographs on the Web," in Proceedings of the 25$^{th}$ ACM International Conference on Multimedia (2017).

The method 500 includes training the neural network as a twin neural network using a ranking loss objective in which the reference image is a positive sample and each image crop thereof is a negative sample (504). The reference image is first input into the network and its feature vector precomputed at the output of a fully connected layer. This forms a baseline against which each image crop is compared when subsequently input. Both inputs share the same weights and other parameters. The usage of a ranking loss, instead of a cross-entropy or mean squared error (MSE) loss, as the objective means that the network predicts the relative distance between the reference image and an image crop, instead of predicting a label or a score directly, which would necessitate laboriously acquired prelabeled (i.e., pre-scored) training data.

The label for each input pair of the reference image and an image crop of the reference image rather is in effect a binary similarity score, which is negative because the image crop is presumed to be aesthetically inferior to the reference image. In this way, the reference image is considered a positive sample and each image crop thereof is considered a negative sample. The network training thus receives the reference image followed by an image crop, and updates the network parameters using the ranking loss between the two during backpropagation. The ranking loss can be expressed as the maximum between zero and C minus d(RI, IC), where d is the distance between the reference image RI and the image crop IC, and C is a margin that regularizes the minimal distance between the ranking scores over successive pairs.

Training of the neural network in this manner may be achieved using a stochastic gradient descent (SGD) with adaptive moment estimation (Adam) optimization technique. Such a technique is described in D. Kingma et al., "Adam: A Method for Stochastic Optimization," 3$^{rd}$ International Conference for Learning Representations (2015). As to the SGD with Adam optimization specifically described in this reference, for instance, the learning rate may be set to 0.01, the batch size may be set to 64, and the momentum set to 0.9. A total of 20 epochs may be run for training, with the model having the smallest validation error ultimately selected for subsequent testing.

If there are further reference images on which basis the neural network is to be trained using image crops as negative samples (506), then the method 500 includes training the neural network using the next reference image (508). Once all the reference images have been used for training the neural network (506), the method 500 is finished (510). The resultantly trained machine learning model can then effectively be used as a single-input neural network to generate a crop score for an image crop of an actual captured image, based on just the image crop alone. Therefore, although the machine learning model is used as a single-input neural network, it is trained as a twin, or Siamese, neural network.

Figure 5B:
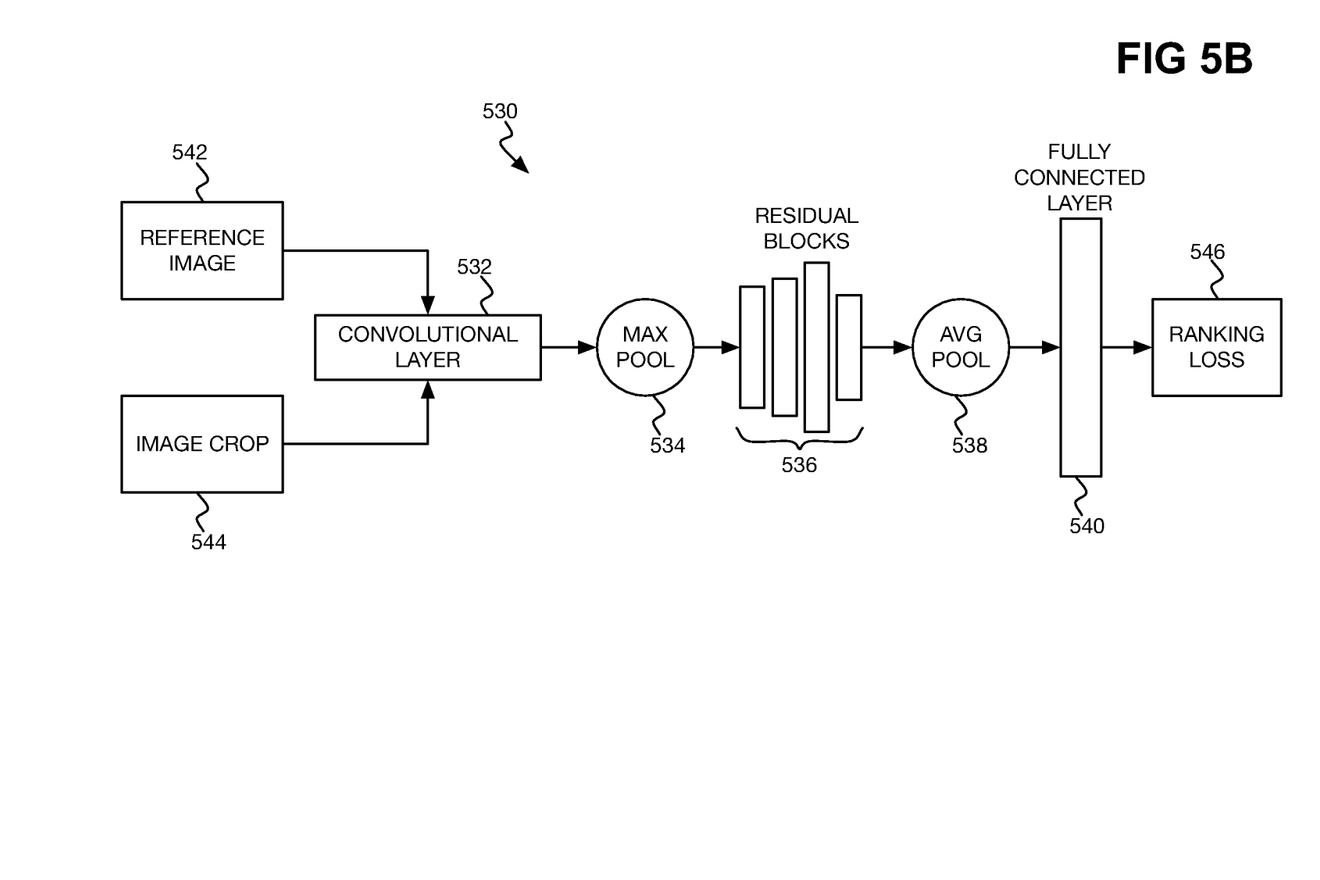
FIG. 5B is a diagram of an example machine learning model that can be trained using the method of FIG. 5A.

FIG. 5B shows an example neural network 530 that can be trained as a twin neural network using the method 500. The neural network 530 may be implemented as a residual neural network (ResNet), such as the ResNet-34 machine learning model described in K. He et al., "Deep Residual Learning for Image Recognition," 2016 IEEE Conference on Computer Vision and Pattern Recognition (2016). The neural network 530 begins with an initial convolutional layer 532 to initially abstract an input image, and a max pooling layer 534, such as a 3×3 max pooling layer, to reduce the dimensionality of the abstracted image. Following the layers 532 and 534, the neural network 530 includes four or another number of residual blocks 536, which are described in detail later in the detailed description, and which provide for skip connections during image processing. The neural network 530 ends with an average pooling layer 538 to reduce the dimensionality of the image as processed by the residual blocks 536, and a fully connected layer 540 that provides the output of the network 530.

In usage, then, a reference image 542 is initially input into the neural network 530 to preset parameters of the layers 532, 534, 538, and 540 and of the blocks 536. An image crop 544 of the reference image 542, which is assumed to be aesthetically inferior to the reference image 542, is then processed through the neural network 530 to obtain the ranking loss 546. The neural network 530 is thus penalized if the image crop 544 scores better than the reference image 542 by the network 530. That is, the parameters of the layers 532, 534, 538, and 540 are updated using the ranking loss 546 between the image crop 544 and the reference image 542 during backpropagation. The neural network 530 is then trained using the next image crop 544 of the reference image 542, and once every image crop 544 of the reference image 542 have been considered, using the next reference image 542 and each image crop 544 thereof, and so on, until every reference image 542 and each image crop 544 has been processed.

Figure 5C:
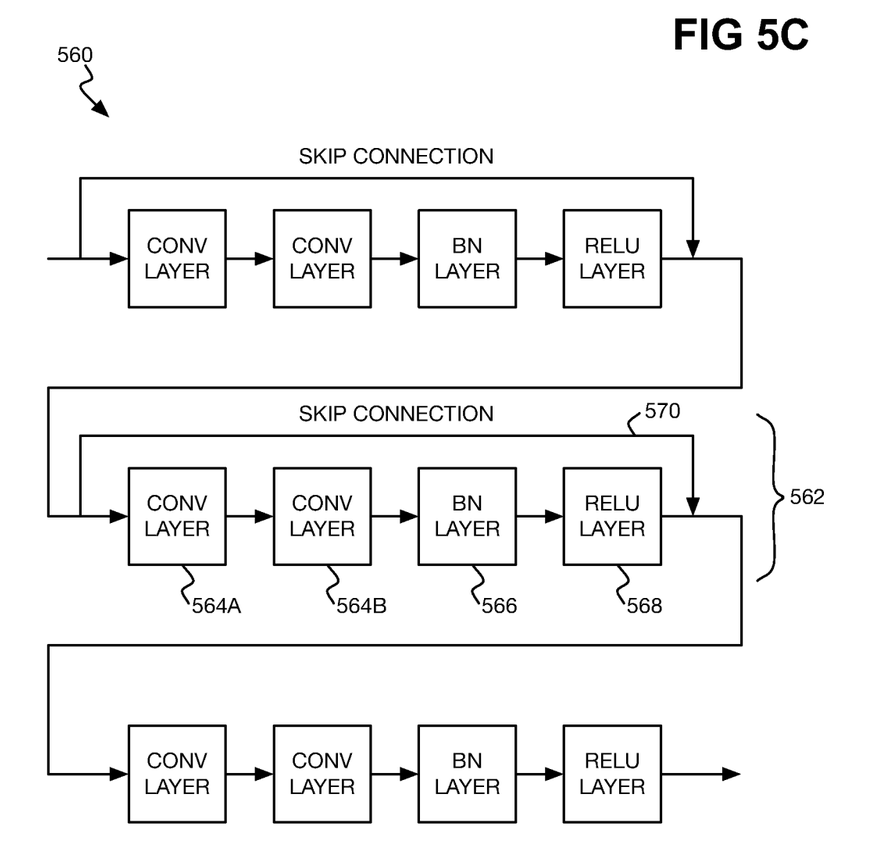
FIG. 5C is a diagram of an example residual block of the machine learning model of FIG. 5B.

FIG. 5C shows an example residual block 560 that can realize each residual block 536 of the neural network 530. The residual block 560 includes a number of layer groups 562. Three layer groups 562 are depicted in the example of FIG. 5C, but there can be fewer or more than three. Each layer group 562 includes a pair of convolutional layers 564A and 564B, which are collectively referred to as the convolutional layers 564, followed by a batch normalization (BN) layer 566 to normalize the output of the layers 564, and a rectified linear unit (ReLU) layer, which is an activation function that may linearize its input if positive and otherwise output zero. Each layer group 562 further includes a skip connection 570 to feed the input of the convolutional layers 564 of the layer group 562 to the convolutional layers 564 of the next layer group 562. Because there is no layer group 562 after the last layer group 562, the last layer group 562 lacks a skip connection 570.

Figure 6:
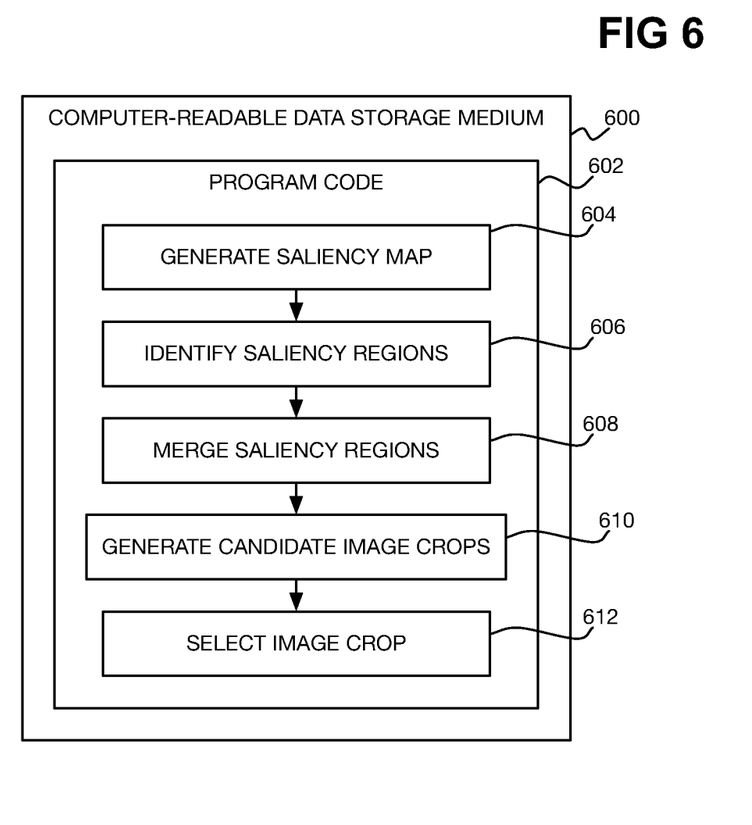
FIG. 6 is a diagram of an example non-transitory computer-readable data storage medium.

FIG. 6 shows an example non-transitory computer-readable data storage medium 600 storing program code 602 that is executable by a processor of a computing device to perform processing. The processing includes generating a saliency map of an image (604), identifying saliency regions of the saliency map (606), and merging the saliency regions into a combined saliency region (608). The processing includes generating candidate image crops of the image based on the combined saliency region (610), and selecting an image crop of the image from the candidate image crops using a machine learning model (612).

Figure 7:
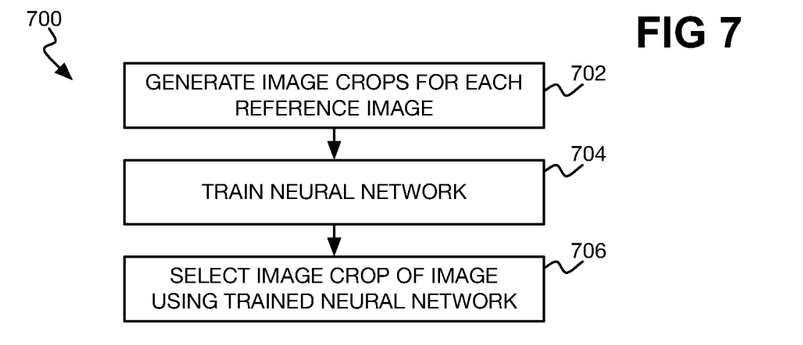
FIG. 7 is a flowchart of an example method.

FIG. 7 shows an example method 700. The method 700 includes generating image crops for each of a number of reference images (702). The method 700 includes training a neural network as a twin neural network based on the reference images and the image crops using a ranking loss objective in which the image crops are negative samples and the reference images are positive samples (704). The method 700 includes selecting an image crop of an image from candidate image crops of the image using the trained neural network (706).

Figure 8:
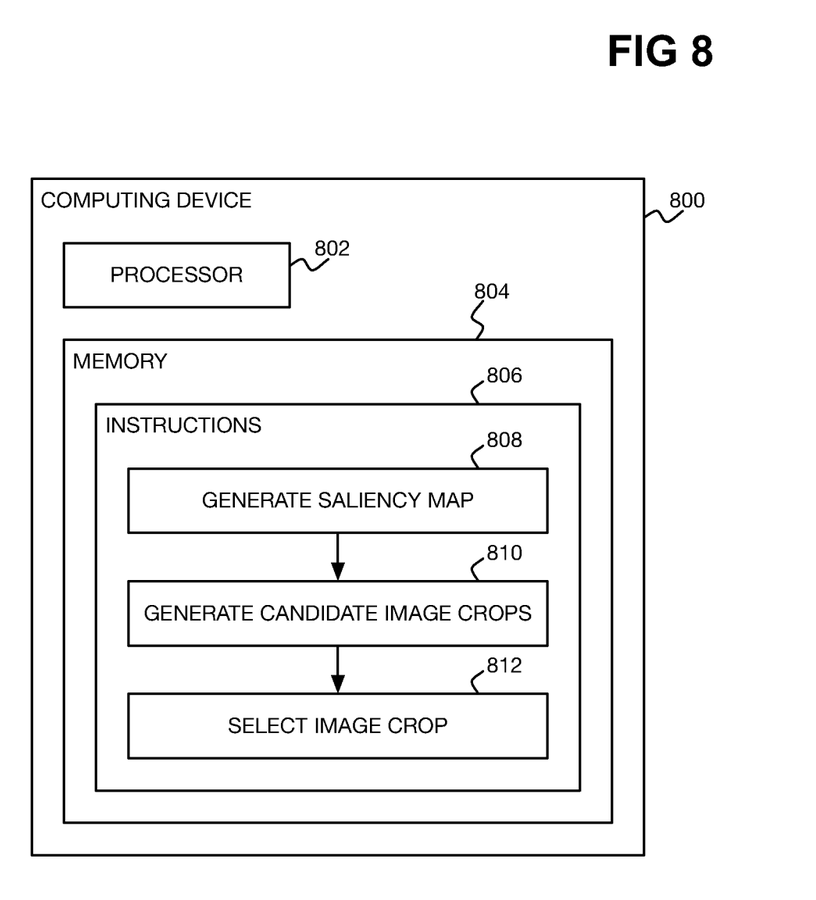
FIG. 8 is a diagram of an example computing device.

FIG. 8 is a diagram of an example computing device 800. The computing device includes a processor 802 and a memory 804 storing instructions 806. The instructions 806 are executable by the processor 802 to generate a saliency map of an image using a first machine learning model (808), and generate candidate image crops based on the saliency map (810). The instructions 806 are executable by the processor 802 to select an image crop of the image from the candidate image crops using a second machine learning model (812).

Techniques have been described herein for automatic image cropping. The techniques generate image crop candidates of an image based on a saliency map that can be generated using a machine learning model such as a deep supervised machine learning model having a skip-layer structure. The techniques then select an image crop of the image from the image crop candidates using a different machine learning model, which may be trained as a twin neural network. The techniques have been shown to select image crops that are more aesthetically pleasing than other automatic image cropping techniques, as evaluated using objective measures including the intersection-over-union (IoU), boundary displacement, and alpha-recall evaluation metrics.

We claim:

1. A non-transitory computer-readable data storage medium storing program code executable by a processor to perform processing comprising:
    generating a saliency map of an image;
    identifying a plurality of saliency regions of the saliency map;
    merging the saliency regions into a combined saliency region;
    generating a plurality of candidate image crops of the image based on the combined saliency region; and
    selecting an image crop of the image from the candidate image crops using a machine learning model, wherein the machine learning model is a neural network trained as a twin neural network based on reference images and image crops of the reference images using a ranking loss objective in which the image crops are negative samples and the reference images are positive samples.

2. The non-transitory computer-readable data storage medium of claim 1, wherein generating the saliency map from the image comprises using a deep supervised machine learning model having a skip-layer structure.

3. The non-transitory computer-readable data storage medium of claim 1, wherein identifying the saliency regions of the saliency map comprises:
    performing a connected-component analysis on the saliency map to segment the saliency map into the saliency regions.

4. The non-transitory computer-readable data storage medium of claim 3, wherein identifying the saliency regions of the saliency map further comprises:
    discarding any saliency region having an area less than a threshold percentage of an area of the saliency map.

5. The non-transitory computer-readable data storage medium of claim 1, wherein merging the saliency regions into the combined saliency region comprises:
    identifying a bounding box of the saliency map encompassing the saliency regions.

6. The non-transitory computer-readable data storage medium of claim 1, wherein generating the candidate image crops based on the combined saliency region comprises:
    dividing the image into a grid of grid regions;
    specifying a first sub-grid of the grid regions at a first corner of the image;

specifying a second sub-grid of the grid regions at a second corner of the image diagonally opposite the first corner; and identifying each candidate image crop that has a first corner in any grid region of the first sub-grid and a second corner in any grid region of the second sub-grid, that has an area greater than a threshold percentage of an area of the image, and that has an aspect ratio within a specified range, and that fully covers the combined saliency region.

7. The non-transitory computer-readable data storage medium of claim 1, wherein generating the candidate image crops based on the combined saliency region comprises:

adjusting the combined saliency region to have a specified aspect ratio;

successively enlarging the combined saliency region horizontally and vertically while maintaining the specified aspect region until the combined saliency region horizontally and/or vertically exceeds the image, to specify a plurality of enlargements of the combined saliency region;

at each enlargement of the combined saliency region, cropping the image in correspondence with the combined saliency region to identify one of the candidate image crops; and discarding any candidate image crop having an area less than a threshold percentage of an area of the image.

8. The non-transitory computer-readable data storage medium of claim 7, wherein generating the candidate image crops based on the combined saliency region further comprises:

repeating, for each of one or multiple additional specified aspect ratios, adjusting the combined saliency region, successively enlarging the combined saliency region until the combined saliency region horizontally and/or vertically exceeds the image, at each enlargement cropping the image, and discarding any candidate image having an area less than the threshold percentage of the area of the image.

9. The non-transitory computer-readable data storage medium of claim 1, wherein selecting the image crop of the image from the candidate image crops using the machine learning model comprises:

inputting each candidate image crop into the machine learning model and receiving as output from the machine learning model a corresponding crop score for each candidate image crop; and selecting the image crop of the image as the candidate image crop having a highest corresponding crop score received as output from the machine learning model.

10. A method comprising:

generating a plurality of image crops for each of a plurality of reference images;

training a neural network as a twin neural network based on the reference images and the image crops using a ranking loss objective in which the image crops are negative samples and the reference images are positive samples; and selecting an image crop of an image from a plurality of candidate image crops of the image using the trained neural network.

11. The method of claim 10, wherein the ranking loss objective is based on a distance between each image crop and a corresponding reference image.

12. The method of claim 11, wherein the ranking loss objective is equal to a maximum of zero and a margin minus the distance.

13. The method of claim 10, further comprising:
generating the candidate image crops based on a saliency map of the image.

14. A computing device comprising:
a processor; and
memory storing instructions executable by the processor to:
generate a saliency map of an image using a first machine learning model;
generate a plurality of candidate image crops based on the saliency map; and
select an image crop of the image from the candidate image crops using a second machine learning model, wherein the second machine learning model is a neural network trained as a twin neural network based on reference images and image crops of the reference images using a ranking loss objective in which the image crops are negative samples and the reference images are positive samples.

15. The method of claim 13, wherein the saliency map is generated using a deep supervised machine learning model having a skip-layer structure.

16. The computing device of claim 14, wherein the first machine learning model is a deep supervised machine learning model having a skip-layer structure.

17. The computing device of claim 14, wherein instructions are executable by the processor to generate the plurality of candidate image crops based on the saliency map by:

dividing the image into a grid of grid regions;
specifying a first sub-grid of the grid regions at a first corner of the image;
specifying a second sub-grid of the grid regions at a second corner of the image diagonally opposite the first corner; and
identifying each candidate image crop that has a first corner in any grid region of the first sub-grid and a second corner in any grid region of the second sub-grid, that has an area greater than a threshold percentage of an area of the image, and that has an aspect ratio within a specified range, and that fully covers the saliency map.

18. The computing device of claim 14, wherein instructions are executable by the processor to generate the plurality of candidate image crops based on the saliency map by:

adjusting the saliency map to have a specified aspect ratio;
successively enlarging the saliency map horizontally and vertically while maintaining the specified aspect region until the saliency map horizontally and/or vertically exceeds the image, to specify a plurality of enlargements of the saliency map;
at each enlargement of the saliency map, cropping the image in correspondence with the saliency map to identify one of the candidate image crops; and
discarding any candidate image crop having an area less than a threshold percentage of an area of the image.

19. The computing device of claim 18, wherein instructions are executable by the processor to generate the plurality of candidate image crops based on the saliency map by further:

repeating, for each of one or multiple additional specified aspect ratios, adjusting the saliency map, successively enlarging the saliency map until the saliency map horizontally and/or vertically exceeds the image, at each enlargement cropping the image, and discarding any candidate image having an area less than the threshold percentage of the area of the image.

\* \* \* \* \*